United States Patent
Liu

(10) Patent No.: US 9,281,092 B2
(45) Date of Patent: Mar. 8, 2016

(54) ULTRAVIOLET LIGHT OVEN FOR GLASS SUBSTRATE

(71) Applicant: Shenzhen China Star Optoelectronics Technology Co., Ltd., Shenzhen, Guangdong (CN)

(72) Inventor: Xiaocheng Liu, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 37 days.

(21) Appl. No.: 14/235,362

(22) PCT Filed: Dec. 24, 2013

(86) PCT No.: PCT/CN2013/090354
§ 371 (c)(1),
(2) Date: Jan. 27, 2014

(87) PCT Pub. No.: WO2015/089862
PCT Pub. Date: Jun. 25, 2015

(65) Prior Publication Data
US 2015/0235724 A1     Aug. 20, 2015

(30) Foreign Application Priority Data

Dec. 20, 2013   (CN) .......................... 2013 1 0711814

(51) Int. Cl.
*G21K 5/00* (2006.01)
*G21K 1/06* (2006.01)
*G21K 5/02* (2006.01)
*G02F 1/1337* (2006.01)

(52) U.S. Cl.
CPC .......... *G21K 1/067* (2013.01); *G02F 1/133788* (2013.01); *G21K 5/02* (2013.01)

(58) Field of Classification Search
None
See application file for complete search history.

(56) References Cited

U.S. PATENT DOCUMENTS

| 4,101,424 | A | * | 7/1978 | Schooley | B41F 23/0409 250/492.1 |
| 4,408,400 | A | * | 10/1983 | Colapinto | B41F 23/0443 118/642 |
| 4,799,136 | A | * | 1/1989 | Molnar | F21V 7/04 362/300 |
| 5,719,706 | A | * | 2/1998 | Masumoto | G02B 3/0056 348/E5.141 |
| 2003/0038911 | A1 | * | 2/2003 | Tanada | G02F 1/133553 349/117 |
| 2005/0254018 | A1 | * | 11/2005 | Magarill | H04N 9/3164 353/94 |

(Continued)

FOREIGN PATENT DOCUMENTS

CN           102914912 A       2/2013

*Primary Examiner* — Andrew Smyth
(74) *Attorney, Agent, or Firm* — Andrew C. Cheng

(57) ABSTRACT

The present invention provides an ultraviolet light oven for aligning liquid crystal molecules, comprising a plurality of ultraviolet light sources, each of the reflectors including a reflecting surface facing to the ultraviolet light source, wherein the reflector includes a first optical portion in the form of recess defined on the refracting surface. The present invention further provides an ultraviolet light oven for aligning liquid crystal molecules, and by providing a first optical portion on a reflecting surface of the reflector, and a second optical portion on the side surface of the reflector to as to properly reflect the light beam with is not directly projected toward the substrate and therefore increase the utilization of the ultraviolet light, the exposure and homogeneousness of the ultraviolet light. As a result, the exposing period is shortened, the working efficiency is increased.

16 Claims, 3 Drawing Sheets

(56) References Cited

U.S. PATENT DOCUMENTS

| | | | |
|---|---|---|---|
| 2007/0161741 A1* | 7/2007 | Ogasawara | C08K 5/005 524/494 |
| 2008/0231847 A1* | 9/2008 | Mack | B60S 1/0822 356/239.7 |
| 2008/0237197 A1* | 10/2008 | Saito | B23K 11/061 219/78.01 |
| 2012/0200801 A1* | 8/2012 | Wheatley | G02B 6/005 349/61 |
| 2013/0064985 A1* | 3/2013 | Chiou | C08F 2/46 427/496 |
| 2013/0320235 A1* | 12/2013 | Lien | H01L 21/67115 250/454.11 |
| 2014/0192285 A1* | 7/2014 | Shinkai | H04N 13/0402 349/15 |
| 2014/0286735 A1* | 9/2014 | Liu | B66F 7/00 414/225.01 |

* cited by examiner

ULTRAVIOLET LIGHT OVEN FOR GLASS SUBSTRATE

FIELD OF THE INVENTION

The present invention relates to a manufacturing technology of liquid crystal panel, and more particularly, to an ultraviolet light oven for baking glass substrate assembly.

BACKGROUND OF THE INVENTION

The liquid crystal display (LCD) is featured with slim and compact, lower energy exhaustion, and low radiation, as a result, it has been widely applied and becomes the main stream of the displaying device. No matter is it notebook computers, mobile phones, or even to the domestic televisions, the liquid crystal display displaying devices have been widely involved into our daily life. However, since the liquid crystal cannot illuminate all by itself, a backlight module in which a light source is provided to project light beam to a liquid crystal displaying panel. Then, images can be properly displayed on the liquid crystal displaying device. The working principle of the liquid crystal display is that liquid crystal molecules are disposed between two glass substrates arranged in parallel to each other. By applying voltage to the liquid crystal molecules, direction of the liquid crystal molecules are changed, and the light beam projected from the backlight module can pass through or blocked so as to display the images or patterns thereon.

Controlling of the alignment of the liquid crystal molecules is one of the vital and essential technologies of manufacturing liquid crystal display. The quality of the images displayed on the liquid crystal display is related to the alignment of the liquid crystal display. Only when the liquid crystal molecules within the liquid crystal display panel are stably and homogeneously aligned, a high quality of image can be assured. In general, the layer used to make the liquid crystal molecules properly aligned is called or referred to as alignment layer. Currently, the liquid crystal display made from the Polymer Stabilized Vertical Alignment, PSVA, through the manufacturing processes of Polymer Stabilized Alignment, PSA, has been widely applied to different fields because of its wide-view angles, high aperture ratio, high contrast, and simplified manufacturing processes.

In the PSVA-type liquid crystal display, a reactive monomer has to be blended into the liquid crystal molecules disposed between the glass substrates in a way that the reactive monomer is completely and thoroughly mixed with the liquid crystal molecules. Meanwhile, each of the glass substrates is applied with a layer of polyimide, PI, serving as an aligning base material. Then, electrical voltage is applied to the glass substrates and then the glass substrate and the mixture are exposed ultraviolet light. Afterward, a so-called phase separation will be experienced between the monomer and the liquid crystal molecules, and a polymer will be deposited onto the aligning layer. With an interaction between the polymer and the liquid crystal molecules, the liquid crystal molecules will be aligned along with the direction of the polymer. As a result, the liquid crystal molecules disposed between the glass substrates can be arranged with predetermined "pre-tile angle". In order to perfect the reactive monomer, the glass substrates have to undergo a baking process under ultraviolet light oven.

When the glass substrate is undergone baking under the ultraviolet light oven, it takes a comparable longer period as the temperature of the ultraviolet light oven is low. Accordingly, the perfection of the reactive monomer will take a longer time. In order to shorten the exposing time and increase the working efficiency, the intensity and the homogeneousness of the ultraviolet light have to be increased. However, the height of the ultraviolet light oven has a limitation, and normally, a reflector is added to increase the intensity and homogeneousness of the ultraviolet light oven. As shown in FIG. 1, a configurational and illustrational view of a prior art ultraviolet oven for baking glass substrate assembly, and it includes a plurality of ultraviolet light sources 300, and a reflector 200 disposed above the ultraviolet light sources 300. A cooling tank 500 is arranged above the reflector 200. During the operation, the cooling water or cooling air can be directed into the cooling tank 500 so as to reduce the working temperature of the reflector 200. Wherein, the reflector 200 has a planar surface 210 facing the ultraviolet light sources 300. In operation, the glass substrate 400 is disposed right under the ultraviolet light sources 300, and a portion of the light beam from the ultraviolet light source 300 is directly exposed onto the glass substrate 400, while the other portion is redirected to expose onto the glass substrate 400 after it is reflected by the reflector 200 so as to maximize the utilization of the ultraviolet light projected upward from the ultraviolet light sources 300. However, this planar reflector 200 has a certain insufficiency: the light beam projected upwardly from the ultraviolet light sources 300 tend to diffuse after it is reflected by the reflector 200. In addition, the path of travel is comparably longer and the energy carried is therefore lost. As a result, when the reflected light beam reaches to the glass substrate 400, the intensity is comparably no strong enough for utilizing. In addition, it will stir the homogeneousness of the ultraviolet light projected across the glass substrate.

SUMMARY OF THE INVENTION

In order to resolve the technologic problem encountered by the prior art, it is an object of the present invention to provide an ultraviolet light oven for baking glass substrate assembly. Not only the exposure of the ultraviolet light can be increased, but the homogeneousness of the ultraviolet light is also ensured. Accordingly, the exposure time can be reduced, and the efficiency can be increased.

In order to achieve the object set forth, the present invention provides an ultraviolet light oven for aligning liquid crystal molecules, comprising a plurality of ultraviolet light sources, each of the reflectors including a reflecting surface facing to the ultraviolet light source, wherein the reflector includes a first optical portion in the form of recess defined on the refracting surface.

Wherein the first optical portion is configured with a plurality of grooves extending along lengthwise or transversal directions of the reflector, wherein the plurality of grooves are arranged in parallel to each other along the transversal or lengthwise directions.

Wherein each of the ultraviolet light sources is arranged in parallel to each other, and each of the ultraviolet light sources is arranged with respect to one of the first grooves.

Wherein the first groove is defined with a curvature such that the light beam projected from the ultraviolet light source is reflected by the first groove and then converge to a substrate corresponding to a middle portion between two adjacent ultraviolet light sources.

Wherein the first groove has a circular cross section.

Wherein the first optical portion is configured with a second grooves arranged in a manner of honeycomb.

Wherein the second grooves are arranged on the reflecting surface of the reflector.

Wherein the second groove is defined with a curvature such that the light beam projected from the ultraviolet light source is reflected by the second groove and then converge to a substrate corresponding to a middle portion between two adjacent ultraviolet light sources.

Wherein the second groove has a circular cross section.

Wherein the reflector further includes a second optical portion defined onto at least two side surfaces of the reflector.

It is another object of the present invention to provide an ultraviolet light oven for aligning liquid crystal molecules, comprising a plurality of ultraviolet light sources, each of the reflectors including a reflecting surface facing to the ultraviolet light source, wherein the reflector includes a first optical portion in the form of recess defined on the refracting surface, and wherein the first optical portion is configured with a plurality of grooves extending along lengthwise or transversal directions of the reflector, wherein the plurality of grooves are arranged in parallel to each other along the transversal or lengthwise directions.

Wherein the reflector further includes a second optical portion defined onto at least two side surfaces of the reflector.

Wherein each of the ultraviolet light sources is arranged in parallel to each other, and each of the ultraviolet light sources is arranged with respect to one of the first grooves.

Wherein the first groove is defined with a curvature such that the light beam projected from the ultraviolet light source is reflected by the first groove and then converge to a substrate corresponding to a middle portion between two adjacent ultraviolet light sources.

Wherein the first groove has a circular cross section.

It is a third embodiment of the present invention to provide an ultraviolet light oven for aligning liquid crystal molecules, comprising a plurality of ultraviolet light sources, each of the reflectors including a reflecting surface facing to the ultraviolet light source, wherein the reflector includes a first optical portion in the form of recess defined on the refracting surface, wherein the first optical portion is configured by a plurality of second grooves arranged in a manner of honeycomb.

Wherein the reflector further includes a second optical portion defined onto at least two side surfaces of the reflector.

Wherein the second grooves are arranged across a reflecting surface of the reflector.

Wherein the second groove is defined with a curvature such that the light beam projected from the ultraviolet light source is reflected by the second groove and then converge to a substrate corresponding to a middle portion between two adjacent ultraviolet light sources.

Wherein the second groove has a circular cross section.

The ultraviolet light oven for baking glass substrate assembly provided by the present invention increases the utilization of the ultraviolet light energy by arranging a first optical portion on the reflecting surface of the reflectors. As such, the projected ultraviolet light beam can be properly focused onto a substrate corresponding to a middle portion of two adjacent ultraviolet light sources after the light beam is reflected by the reflector. By this arrangement, reflective loss of the ultraviolet beam because of diffusion can be avoided. Accordingly, the utilization of the ultraviolet light is increased, and the exposing time can be reduced while the efficiency can be increased. Meantime, the ultraviolet light oven further provides a second optical portion on side surfaces of the reflector so as to increase the exposure and homogeneousness of the ultraviolet light.

BRIEF DESCRIPTION OF DRAWINGS

FIG. 2 is still a configurational and illustrational view of an ultraviolet oven for baking glass substrate assembly made in accordance with a first embodiment the present invention, wherein FIG. 2b is a cross sectional view taken along direction A-A of FIG. 2a;

FIG. 4 is still a configurational and illustrational view of an ultraviolet oven for baking glass substrate assembly made in accordance with a second embodiment the present invention, wherein FIG. 4b is a cross sectional view taken along direction B-B of FIG. 4a.

DETAILED DESCRIPTION OF PREFERRED EMBODIMENT

A detailed description of the preferred embodiments made in accordance with the present invention will be given herebelow so as to elaborate the present invention along with the accompanied drawings in which like elements will be marked with similar numeral references.

Embodiment 1

Figure 1:
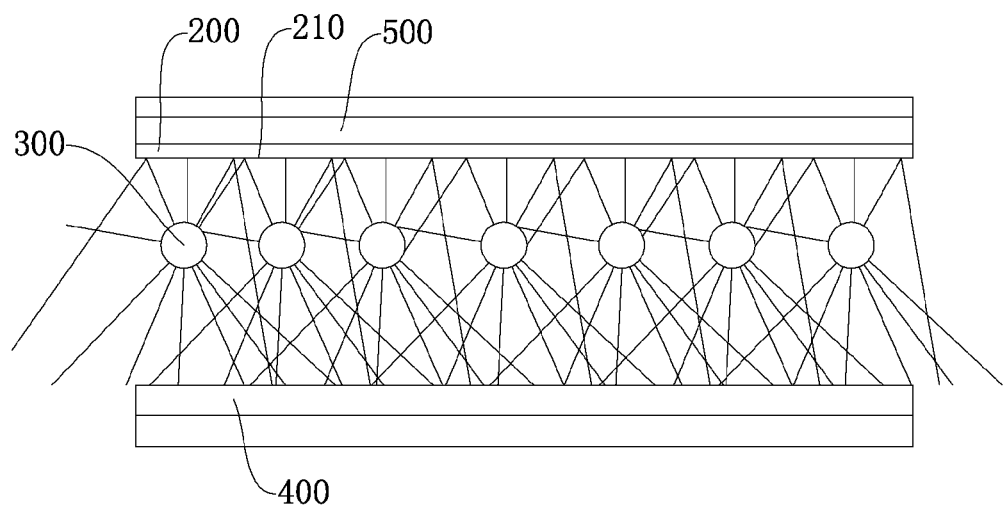
FIG. 1 is a configurational and illustrational view of a prior art ultraviolet oven for baking glass substrate assembly.
Figure 2A:
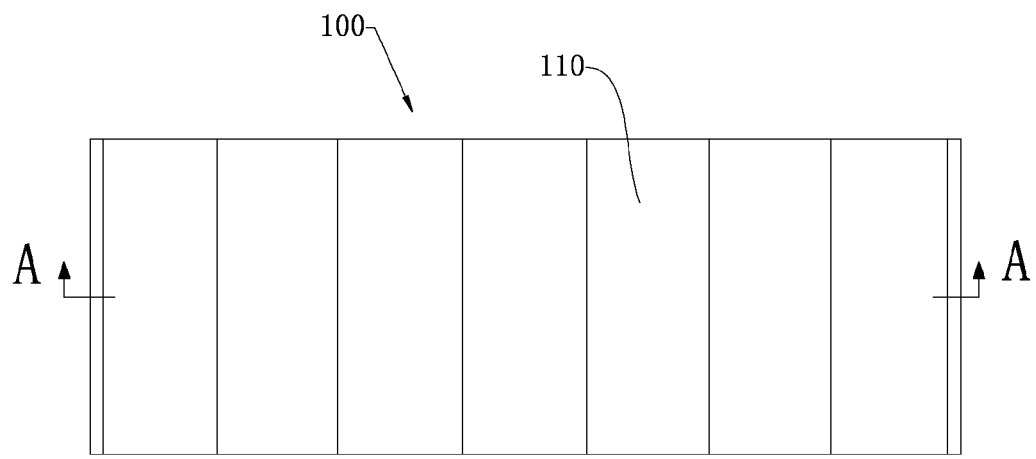
FIG. 2a is a configuration and illustrational view of a reflective surface of a reflector.
Figure 2B:
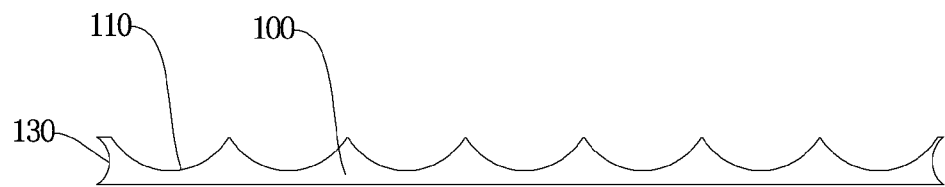
Figure 3:
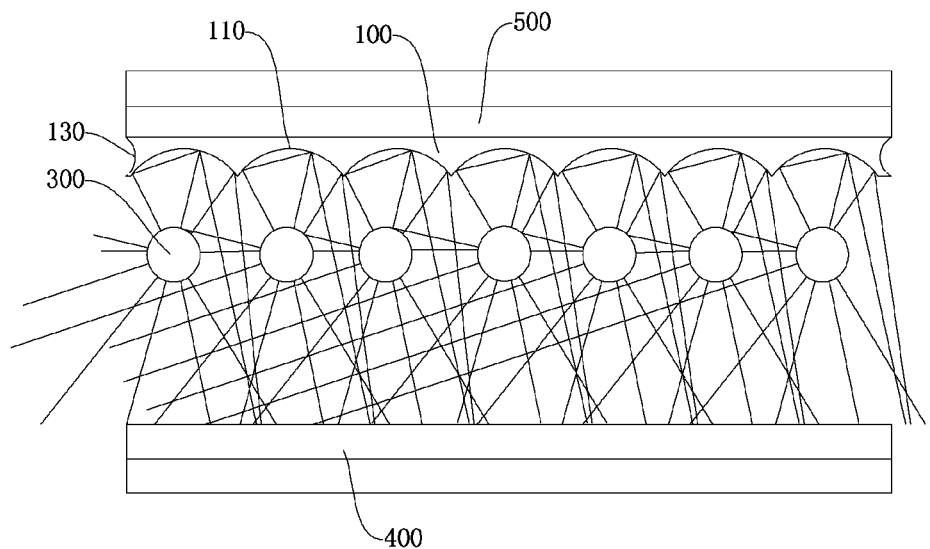
FIG. 3 is a configurational and illustrational view of an ultraviolet oven for baking glass substrate assembly made in accordance with a first embodiment the present invention.

Referring to FIGS. 2 and 3, an ultraviolet light oven for processing alignment of the liquid crystal molecules made in accordance with the present invention generally includes a plurality of ultraviolet light sources 300 and a reflector 100. Wherein the reflector 100 includes a reflecting surface facing toward the ultraviolet light source 300. The reflecting surface of the reflector 100 is provided with a first optical portion embodiment in the manner of recess. In the current embodiment, the first optical portion is configured by a plurality of first grooves 110 extending along a lengthwise direction of the reflector 100. Each of the grooves 110 is in parallel with each other along the transversal direction of the reflector 100. Of course, in other embodiments, the first optical portion 100 can be configured with a plurality of first grooves 110 extending along the transversal direction of the reflector 100. Each of the grooves 110 is in parallel with each other along the lengthwise direction of the reflector 100. The first groove 110 has a circular cross section perpendicular to the reflecting surface. Of course, in other preferred embodiment, the first groove 110 can have an oblong or triangular cross section. The plurality of ultraviolet light sources 300 is disposed under the reflector 100. Wherein each of the ultraviolet light sources 300 is arranged to corresponding to one of the first grooves 110. The distance between the ultraviolet light sources 300 and the reflector 100 is related to the overall height of the ultraviolet light oven, and also determines the curvature of the first groove 110. Substantially, the curvature of the first groove 110 is set to a value that the light beam projected from the ultraviolet light source 300 is reflected by the first groove 110 and then converge to a substrate 400 corresponding to a middle portion between two adjacent ultraviolet light sources 300. A cooling groove 500 is defined above the reflector 100 as cooling water or cooling air can be pumped in to cool down the operating temperature of the reflector 100 during the operation.

During the operation of the ultraviolet light oven, the substrate 400 to be heated and baked is disposed right under the ultraviolet light source 300. A portion of the light beam projected from the ultraviolet light source 300 is projected directly toward the substrate 400, while another portion of the light beam projected from the ultraviolet light source 300 is projected toward the substrate 400 after it is reflected by the first groove 110. As a result, the light beam projected upward from the ultraviolet light source 300 can also be utilized. The first groove 110 has the curvature making the light beam projected upwardly from the ultraviolet light source being focused on the substrate 400 in a position corresponding to the middle portion of two adjacent ultraviolet light sources 300. According, light loss resulted from prolonged path of the reflection can be avoided while the utilization of the ultraviolet light is increased. In addition, the exposure and homogeneousness of the ultraviolet light are also increased. As a result, the exposure time is reduced, while the efficiency is increased.

Furthermore, the reflector 100 includes a second optical portion located on two side surfaces thereof. In the current embodiment, the second optical portion is embodied as a plurality of third grooves 130 arranged in a manner of honeycomb on the side surfaces of the reflector 100. The third grooves 130 are evenly distributed across the side surfaces of the reflector 100. The third groove 130 has a circular cross section so as to properly reflect the light beam which is not directly projected onto the substrate 400 and the reflector 100 back to the substrate 400. By this arrangement, the utilization of the ultraviolet light is increased, and the exposing intensity of the ultraviolet light is also increased. Of course, on other embodiment, the second optical portion can also be configured by recesses defined along the lengthwise or traversal directions of the reflector 100. The cross section of the groove can also be embodied in oblong or triangular shape.

Embodiment 2

Figure 4A:
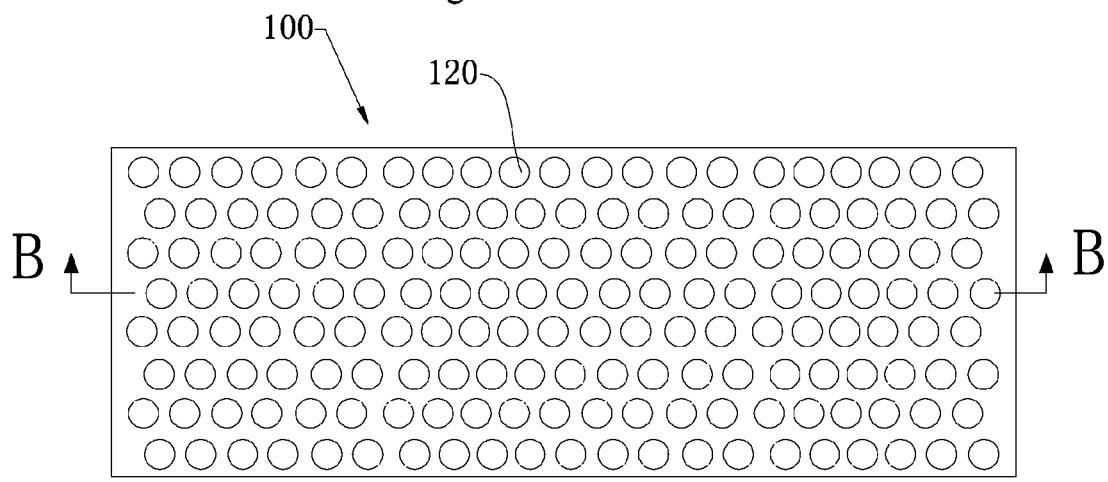
FIG. 4a is a configuration and illustrational view of a reflective surface of a reflector.
Figure 4B:
Figure 5:
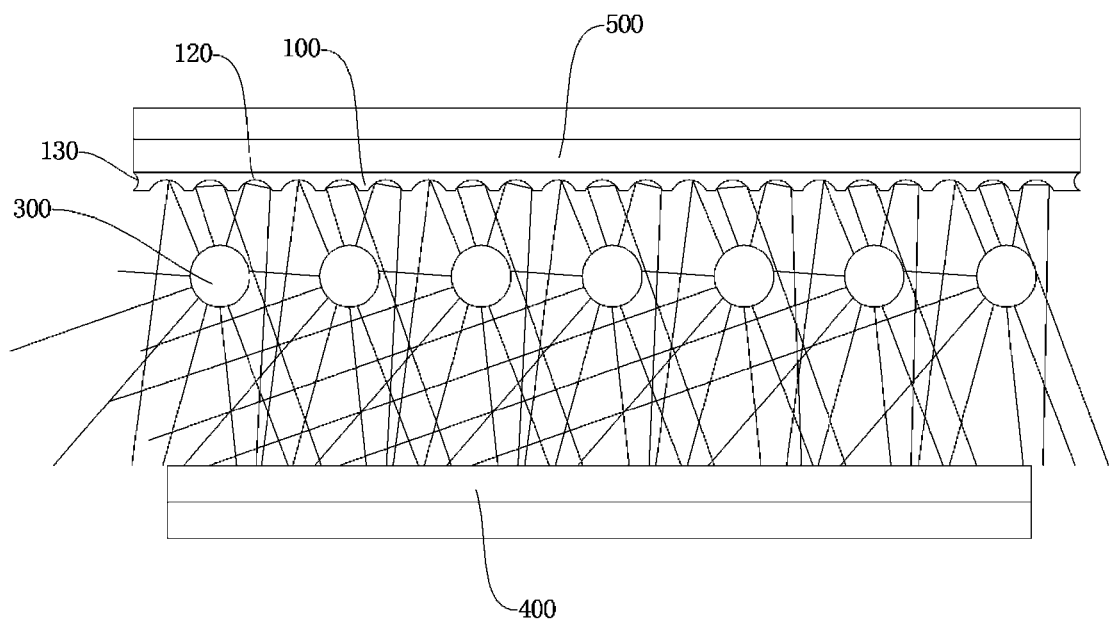
FIG. 5 is a configurational and illustrational view of an ultraviolet oven for baking glass substrate assembly made in accordance with a second embodiment the present invention.

Referring to FIGS. 4 and 6, an ultraviolet light oven for processing alignment of the liquid crystal molecules made in accordance with the present invention generally includes a plurality of ultraviolet light sources 300 and a reflector 200. Wherein the reflector 200 includes a reflecting surface facing toward the ultraviolet light source 300. The reflecting surface of the reflector 200 is provided with a first optical portion embodied in the manner of recess. In the current embodiment, the first optical portion is configured by a plurality of second grooves 120 arranged in a manner of honeycomb on the reflecting surface of the reflector 200. The second groove 120 has a circular cross section in parallel to the reflecting surface. Of course, in other preferred embodiment, the second groove 120 can have an oblong or other cross section. The plurality of ultraviolet light sources 300 is disposed under the reflector 200. The distance between the ultraviolet light sources 300 and the reflector 200 is related to the overall height of the ultraviolet light oven, and also determines the curvature of the second groove 120. Substantially, the curvature of the first groove 120 is set to a value that the light beam projected from the ultraviolet light source 300 is reflected by the second groove 120 and then converge to a substrate 400 corresponding to a middle portion between two adjacent ultraviolet light sources 300. A cooling groove 500 is defined above the reflector 100 as cooling water or cooling air can be pumped in to cool down the operating temperature of the reflector 100 during the operation.

During the operation of the ultraviolet light oven, the substrate 400 to be heated and baked is disposed right under the ultraviolet light source 300. A portion of the light beam projected from the ultraviolet light source 300 is projected directly toward the substrate 400, while another portion of the light beam projected from the ultraviolet light source 300 is projected toward the substrate 400 after it is reflected by the second groove 120. As a result, the light beam projected upward from the ultraviolet light source 300 can also be utilized. Preferably, the second groove 120 has the curvature making the light beam projected upwardly from the ultraviolet light source being focused on the substrate 400 in a position corresponding to the middle portion of two adjacent ultraviolet light sources 300. According, light loss resulted from prolonged path of the reflection can be avoided while the utilization of the ultraviolet light is increased. In addition, the exposure and homogeneousness of the ultraviolet light are also increased. As a result, the exposure time is reduced, while the efficiency is increased. Meanwhile, since the depth of the second groove 120 can be comparably shallow to meet the requirement. Accordingly, the ultraviolet light oven made in accordance with the present invention can be installed with smaller space requirements. The operational cost is also reduced.

Furthermore, the reflector 100 includes a second optical portion located on two side surfaces thereof. In the current embodiment, the second optical portion is embodied as a plurality of third grooves 130 arranged in a manner of honeycomb on the side surfaces of the reflector 100. The third grooves 130 are evenly distributed across the side surfaces of the reflector 100. The third groove 130 has a circular cross section so as to properly reflect the light beam which is not directly projected onto the substrate 400 and the reflector 100 back to the substrate 400. By this arrangement, the utilization of the ultraviolet light is increased, and the exposing intensity of the ultraviolet light is also increased. Of course, on other embodiment, the second optical portion can also be configured by recesses defined along the lengthwise or traversal directions of the reflector 100. The cross section of the groove can also be embodied in oblong or triangular shape.

In conclusion, the ultraviolet light oven for baking glass substrate assembly provided by the present invention increases the utilization of the ultraviolet light energy by arranging a first optical portion on the reflecting surface of the reflectors. As such, the projected ultraviolet light beam can be properly focused onto a substrate corresponding to a middle portion of two adjacent ultraviolet light sources after the light beam is reflected by the reflector. By this arrangement, reflective loss of the ultraviolet beam because of diffusion can be avoided. Accordingly, the utilization of the ultraviolet light is increased, and the exposing time can be reduced while the efficiency can be increased. Meantime, the ultraviolet light oven further provides a second optical portion on side surfaces of the reflector so as to increase the exposure and homogeneousness of the ultraviolet light.

It should be noted that in the present invention, the terms of "first" and "second" are merely used to describe the operation of one embodiment over another embodiment, while does not impose any limitations to the substantial differences or operational relationships or orders between the embodiments explicitly or implicitly. Moreover, the term "comprising", "including" or any other variants thereof are intended to cover a non-exclusive inclusion, such that a number of elements including the process, method, article, or device including not only those elements, but also not explicitly listed other elements, or also for such process, method, article, or those elements inherent device. In the case where no more restrictions, by the statement "includes a . . . " qualified elements, including the said element does not exclude a process, method, article or device is also the same as the other elements present.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. An ultraviolet light oven for aligning liquid crystal molecules, comprising a plurality of ultraviolet light sources and a reflector, the reflector including a reflecting surface facing the ultraviolet light sources and two side surfaces at opposite ends of the reflecting surface and facing away from each other, wherein the reflector includes a first optical portion in the form of recesses defined on the reflecting surface and a second optical portion comprising recesses having a circular cross section and formed in and uniformly distributed on each of the side surfaces of the reflector so that the recesses of the two side surfaces face away from each other and are located outside of the ultraviolet light sources irradiation area.

2. The ultraviolet light oven as recited in claim 1, wherein the first optical portion is configured with a plurality of first grooves extending in a lengthwise or transversal direction of the reflector, wherein the first grooves are arranged in parallel to each other in the transversal or lengthwise direction.

3. The ultraviolet light oven as recited in claim 2, wherein the ultraviolet light sources are arranged in parallel to each other, and each of the ultraviolet light sources is arranged with respect to and corresponding to one of the first grooves.

4. The ultraviolet light oven as recited in claim 3, wherein each of the first grooves is defined with a curvature such that light projected from the corresponding ultraviolet light source is reflected by the first groove and then converges to a substrate corresponding to a middle portion between two adjacent ultraviolet light sources.

5. The ultraviolet light oven as recited in claim 2, wherein each of the first grooves has a circular cross section.

6. The ultraviolet light oven as recited in claim 1, wherein the first optical portion is configured with a plurality of second grooves arranged in a manner of honeycomb.

7. The ultraviolet light oven as recited in claim 6, wherein the second grooves are arranged on the reflecting surface of the reflector.

8. The ultraviolet light oven as recited in claim 6, wherein each of the second grooves is defined with a curvature such that light projected from a corresponding one of the ultraviolet light sources is reflected by the second groove and then converges to a substrate corresponding to a middle portion between two adjacent ultraviolet light sources.

9. The ultraviolet light oven as recited in claim 6, wherein each of the second grooves has a circular cross section.

10. An ultraviolet light oven for aligning liquid crystal molecules, comprising a plurality of ultraviolet light sources and a reflector, the reflector including a reflecting surface facing the ultraviolet sources, wherein the reflector includes a first optical portion in the form of recesses defined on the reflecting surface and a second optical portion comprising recesses having a circular cross section and formed in and uniformly distributed on each of the side surfaces of the reflector so that the recesses of the two side surfaces face away from each other and are located outside of the ultraviolet light sources irradiation area; and wherein the first optical portion is configured with a plurality of first grooves extending in a lengthwise or transversal direction of the reflector, wherein the first grooves are arranged in parallel to each other in the transversal or lengthwise direction.

11. The ultraviolet light oven as recited in claim 10, wherein the ultraviolet light sources are arranged in parallel to each other, and each of the ultraviolet light sources is arranged with respect to and corresponding to one of the first grooves.

12. The ultraviolet light oven as recited in claim 11, wherein each of the first grooves is defined with a curvature such that light projected from the corresponding ultraviolet light source is reflected by the first groove and then converges to a substrate corresponding to a middle portion between two adjacent ultraviolet light sources.

13. The ultraviolet light oven as recited in claim 10, wherein each of the first grooves has a circular cross section.

14. An ultraviolet light oven for aligning liquid crystal molecules, comprising a plurality of ultraviolet light sources and a reflector, the reflector including a reflecting surface facing the ultraviolet light sources, wherein the reflector includes a first optical portion in the form of recesses defined in the reflecting surface, such that the first optical portion comprises a plurality of second grooves formed in and uniformly distributed on the reflecting surface, each of the second grooves comprising a circular dimple formed in the reflecting surface and having a circular arc cross section, the dimples being distributed across the reflecting surface; and wherein the reflector includes a second optical portion comprising recesses having a circular cross section and formed in and uniformly distributed on each of the side surfaces of the reflector so that the recesses of the two side surfaces face away from each other are located outside of the ultraviolet light sources irradiation area.

15. The ultraviolet light oven as recited in claim 14, wherein the reflector further includes a second optical portion defined onto at least two side surfaces of the reflector.

16. The ultraviolet light oven as recited in claim 14, wherein the circular arc cross section of the dimple of each of the second grooves is defined with a curvature such that light projected from a corresponding one of the ultraviolet light sources is reflected by the second groove and then converges to a substrate corresponding to a middle portion between two adjacent ultraviolet light sources.

\* \* \* \* \*